Patented Nov. 27, 1928.

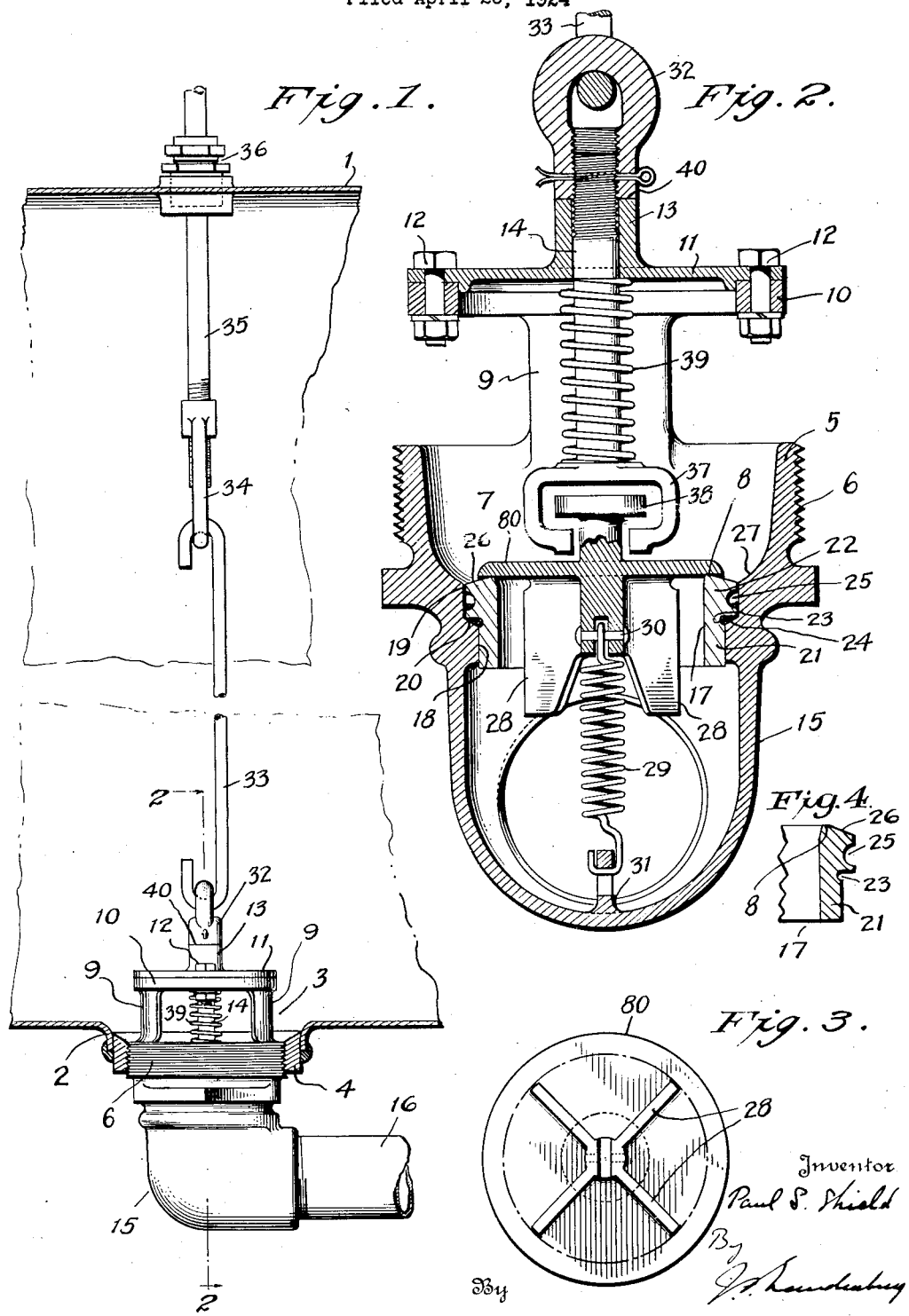

1,693,257

UNITED STATES PATENT OFFICE.

PAUL S. SHIELD, OF CINCINNATI, OHIO, ASSIGNOR TO AUGUSTINE DAVIS, JR., OF COVINGTON, KENTUCKY.

TANK VALVE.

Application filed April 25, 1924. Serial No. 708,850.

This invention relates to valves, more particularly valves for closing the bottom outlets of tanks. Gasoline truck tanks are equipped with what are known as emergency valves, the duty of which is to prevent the liquid contents passing from the tank compartments to the faucet piping in case of damage to the pipes or faucets by collision or otherwise, or in case of opening of the faucets by mischievous or dishonest persons. It is highly important that these valves be quick and reliable in their operation and permit of free flow when open, and that they be tight when closed and be capable of remaining so under the special conditions of installation and use of such valves.

The object of the invention is to provide a valve which shall satisfy these requirements and be a marked improvement over prior devices. The invention can best be explained in connection with a description of the preferred embodiment shown in the drawing, and will be more particularly pointed out in the claims.

In the accompanying drawing forming part hereof:

Fig. 1 is a fragmentary vertical section through a vehicle tank, showing one of the valves and parts of a form of operating mechanism therefor in elevation;

Fig. 2 is an enlarged vertical section through the valve, looking at right angles to Fig. 1;

Fig. 3 is a bottom plan view of the valve member; and

Fig. 4 is a fragmentary sectional elevation of the valve seat annulus.

The Davis and Betts Patent 1,284,063 of Nov. 5, 1918, may be referred to for an illustration of a prior valve construction upon which, more particularly, this invention is an improvement.

In the present drawings, the tank shell, or the shell of one of the tank compartments, is marked 1, and 2 is an outwardly flanged bottom outlet opening therein. The valve body 3 is secured in this opening by a screw-joint, effected by screwing the body upwardly from beneath into an internally-threaded outlet collar 4, which is welded to the outlet flange, as in the said Davis and Betts patent.

The Davis and Betts valve has been largely used and embodies much that has proved advantageous, but it has had a baffling tendency to leak, difficult to account for from the construction of the valve itself. I have ascertained that the difficulty has been due to distortion of the valve under the stress of screwing it into the outlet collar, which is likely to be slightly out of round from the welding. In tests which have been made instances were found of valves which when placed on an air-testing machine were perfectly tight, but, when screwed into the tank outlet and there tested again in the same way, leaked. The same valves, when removed from the outlet and put back on the testing machine, were again tight, leading to the conclusion that there had been enough distortion of the valves when screwed in place to cause leakage, though not enough to give the metal a permanent set.

To overcome this difficulty I have thought to offset the valve-seat contained in the body from the zone of potential distortion which includes the screw joint. More particularly describing the body, it will be seen that it has a circumferential wall 5 the exterior of which is cut with a screw-thread 6, preferably tapered, for engagement with the threads of the collar. This wall surrounds a basin 7, at the bottom of which, below the threads, is an annular, upwardly-facing valve-seat 8.

The upper part of the body is narrower than the screw-threaded wall, so that it will pass freely through the outlet collar when the body is inserted or removed, and comprises separated limbs 9, affording ample lateral entrances between them for liquid, and a top ring 10 integral with the tops of the limbs. A top 11 is bolted at 12 to the ring 10, and is formed with a central guide opening and boss 13 for a valve-rod 14.

The lower part 15 of the valve body, which projects below the tank, is formed with one or more lateral connection openings for the reception of the faucet piping 16.

I preferably make the valve-seat separate from the body proper, which not only permits making the body of a stiffer casting, more resistant to distortion, with a soft seat of bronze or the like, but also causes the seat to be even more independent of any strains arising in the screw-bearing part.

It will be seen that the interior of the body, below the screw wall, is formed with a socket to receive an annulus 17. The socket is of two diameters, the lower internal cylindrical face 18 being of somewhat narrower diameter, and the upper face 19 being of somewhat wider diameter, with an intervening shoulder 20 sloping inward and downward. The lower hollow cylindrical part 21 of the annulus fits the face 18 with a close, drive fit. This region, it will be observed, is offset from the zone of the screw joint. The upper, thicker part 22 preferably substantially fills the larger portion 19 of the socket, but is free, that is to say out of contact therewith. The horizontal valve seat is formed on the top of this free part and is consequently entirely unaffected by any strains that may be created in the body as the result of screwing it into the tank outlet.

The upper part of the annulus 17 is provided with an external circumferential groove 23 at the junction between the larger and smaller diameters and facing the shoulder 20. This groove is adapted to be filled with an impervious compound 24, which is put in the groove before the annulus is pressed into the body. When the annulus is forced into place the body of compound in the groove is squeezed against the shoulder and into the lower part of the crevice between the upper part of the annulus and the surrounding wall, and insures a perfectly tight joint between the seat annulus and the body. A mixture of litharge and glycerine is impervious to gasoline. A second groove 25 above the first, and facing the surrounding, slightly spaced wall, receives any excess material which is squeezed out of the lower groove The valve-seat 8 is flat, and the under, seating surface of the valve disk 80 is likewise flat. This insures that any slight lateral distortion or displacement can not impair the tight seating contact. The valve-seat is made quite narrow, in order that the valve may be ground in to a perfect seat, and the wider part 26 of the top of the annulus, surrounding the seat, is relieved by sloping it downward and outward at a low angle which permits the basin 7, the lower curve 27 of which is adjoined by said slope, to flush itself free of any sediment in the liquid that is passed through the valve.

The valve-disk is further provided with its own guiding means, and with its own seating spring, and is otherwise unconstrained, being coupled or related to the valve-rod, or the operating means, in a manner permitting lateral freedom to the valve.

Specifically, the valve disk has guide wings 28 extending downward from its under side, the outer edges of these wings being in guiding relation to the inner wall of the annulus, slight clearance, however, being provided as indicated by the broken-line circle of Fig. 3 representing the internal circuit of the annulus, so that the valve is sufficiently free for lateral self-adjustment relative to the valve-seat. A light seating spring 29 is connected at its upper end to a pin 30 at the center of the wing structure of the valve member, and at its lower end to an anchorage lug 31 projecting upward from the bottom wall of the lower part of the body. This spring is calculated to insure proper seating of the valve while avoiding any such heavy pressure or hammering between the valve and valve seat as would be liable to produce wear or warping.

The valve-rod 14 is shown connected to other operating parts or connections, including an eye-head 32 which is screwed and pinned to the upper end of the rod above the top 11, a link 33 hooked into the eye-head at its lower end and into a turn-buckle loop 34 at its upper end, and a rod 35, to which said loop is adjustably screwed, passing through a suitable guide and stuffing-box 36 in the top of the tank. These connections, which are similar to those disclosed in the Davis and Betts patent, may be connected to further operating mechanism controlling the valves of a plurality of the compartments as a unit, as has become the practice, but I do not limit myself to any precise operating means for unseating the valve-member, as other forms and types of operating means may be employed.

The lower end of the valve rod is a yoke 37, which embraces a button 38 on the upper side of the valve disk. The coupling thus formed is of a character which affords latitude for relative movement or displacement between the valve-member and its operating rod, both straight laterally and vertically, with consequent complete freedom of the valve member from outside pressure or constraint, that is to say pressure or constraint other than its own light spring and guiding means, when the valve is seated and the operating means is in the corresponding normal position. Thus, it will be seen in Fig. 2 that the yoke is spaced from the button and the valve disk in all directions up and down and sidewise. A comparatively heavy restoring spring 39 about the rod, confined between the top 11 and the yoke end, serves to overcome the inertia and friction of the operating means and return it to the "closed" position, but the pressure of this spring is not allowed to act upon the seated valve disk, which, together with the seat, are consequently protected from a serious cause of wear and injury. To this end the top 40 of the boss 13 is arranged as a stop in conjunction with the shoulder formed by the lower end of the eye-head, so that, when the valve rod and parts connected thereto are depressed by the spring 39 as far as the stop will permit, the valve rod is held clear of the seated valve-disk, the relations being such that the valve-disk can then neither be pressed upon, downwardly, by the valve stem, nor held upward off its seat. When the valve stem is actuated in the upward direction to open the valve there is an initial amount of free-motion before the valve-disk is picked up.

It should be understood that I do not limit myself to the precise form and details of the

What I claim as new is:

1. In a tank having a screw-threaded outlet collar, a valve for closing said outlet comprising a valve disk, a body provided with a screw-threaded portion for engagement with the thread of said collar, and a valve-seat annulus supported at its lower portion by a region of said body offset from the zone of potential distortion which includes the screw joint between the body and the collar, said annulus extending upward free from the wall of the body and carrying the seat for the valve disk.

2. In a tank having a screw-threaded outlet collar, a valve for closing said outlet comprising a valve disk, a body provided with a screw-threaded portion for engagement with the thread of said collar, and a separate annular member the lower portion of which is fitted tightly in the body at a region offset from the zone of potential distortion which includes the screw joint between the body and the collar, the upper portion of said member which is free of the wall of the body being formed with a seat for the valve disk.

3. A tank outlet valve comprising a body bearing external screw-threads so that it may be screwed into the outlet, and containing an annular valve-seat for a valve disk, said valve-seat being formed on the free upper portion of a separate annulus, the lower portion of which is fitted tightly into a socket in the body which is below the region of the screw joint between the body and the outlet.

4. A valve comprising a body adapted to be screw-jointed to an outlet, said body bearing external screw-threads for that purpose on a circumferential wall, so that it may be screwed into the outlet, and containing an annular valve-seat for a valve-disk which is depressed with reference to the zone of the screw joint, said seat being formed on the free upper portion of a separate annulus, the lower portion of which is pressed into a cylindrical socket in the body, the seat being flat, and the cooperating valve disk having a flat face permitting relative lateral displacement without disturbing the seating, substantially as set forth.

5. A valve comprising a body adapted to be screw-jointed to a bottom outlet, said body bearing external screw-threads for that purpose on a circumferential wall, so that it may be screwed into the outlet, and containing an annular valve-seat for a valve-disk which is depressed with reference to the zone of the screw joint, said seat being formed on the free upper portion of a separate annulus, the lower portion of which is pressed into the body, the seat being flat and narrow and the top of the annulus around the seat being sloped downward at a low flushing angle to the surrounding basin, substantially as set forth.

6. A valve comprising a body containing a socket for an annulus, and an annulus the lower part of which is pressed in the socket and the upper part of which is adjacent but out of contact with the surrounding wall and bears an annular valve seat, there being a circumferential groove between the annulus and the socket containing impervious compound.

7. A valve comprising a body containing a socket for an annulus, and an annulus the lower part of which is pressed in the socket and the upper part of which is adjacent but out of contact with the surrounding wall and bears an annular valve seat, there being a circumferential groove between the annulus and the socket containing impervious compound, together with a second groove for receiving compound forced out of the first groove.

8. In a valve, a body containing a socket for an annulus, said socket comprising portions of different diameters with an intervening shoulder, and a valve-seat annulus having a part pressed into the smaller portion of the socket and a part of larger diameter bearing the valve seat which is out of contact with the adjacent surrounding wall of the larger portion of the socket, said annulus having a circumferential groove in its side at the junction of its larger and smaller portions facing said shoulder, and a filling of impervious compound in said groove.

9. In a tank having a bottom outlet, a valve-seat at said outlet, a valve-disk adapted to rest on the seat, operating mechanism extending upward from the valve-disk through the tank for drawing the disk off the seat, a heavy restoring spring acting upon said mechanism, a light seating spring acting upon the valve-disk, and means whereby the valve-disk and seat are relieved of the pressure of the first-mentioned spring.

10. A valve comprising a body containing an annular valve-seat, a valve-disk to rest upon said seat, said valve-body having an upper part and a lower or outlet part, a valve-rod, to which operating connections are applied, passing through the top of said upper part, a loose coupling between said valve-rod and the valve-disk, a heavy restoring spring on said valve-rod beneath said top, a light seating spring beneath the valve-disk connecting the same with an anchorage in the lower part of the valve body, and a stop on the upper part of the valve body so positioned as to keep the valve-rod from either pressing on the valve-disk on the one hand or holding it off the seat on the other hand in the closed condition of the valve.

11. A bottom outlet valve for tanks comprising a body containing an annular valve-seat, a valve-disk to rest upon said seat, said valve-disk carrying a button, a valve-rod, to which operating means are applied, having a yoke at its lower end embracing said button, the coupling between the valve-rod and valve-disk thus constituted affording latitude in the vertical direction, a restoring spring effective upon the valve-rod, a light seating spring acting upon the valve-disk, and a stop for the valve-rod, substantially as set forth.

12. In a valve of the kind described, the combination of an annular valve-seat, a valve-disk having a flat under face to rest on the seat and downwardly extending guides on its under portion, a light seating spring connected with the valve-disk, a valve-rod to which operating means are applied, a restoring spring effective upon the valve-rod, a coupling between the valve-rod and valve-disk affording latitude in both vertical and horizontal directions, and a stop for the valve-rod, substantially as set forth.

13. In a tank having a bottom outlet, a valve body applied thereto and containing an annular valve-seat, a valve-disk having a flat under face to rest on said valve seat and guiding means extending downward from its under portion, a light seating spring connected to the valve-disk, a valve-rod above the valve-disk to which operating means are applied, a stop to keep pressure of the valve-rod off the disk, and a coupling between the valve-rod and valve-disk affording latitude for straight relative lateral displacement.

14. In a tank having a bottom outlet, a valve body applied thereto and containing an annular valve-seat, a valve-disk having a flat under face to rest on said valve-seat and being further provided with its own guiding means and seating spring, the valve-seat and valve-disk permitting of relative straight lateral movement, and operating means of a character affording lateral freedom to the valve-disk, substantially as set forth.

PAUL S. SHIELD.